United States Patent
Talebi et al.

(10) Patent No.: US 12,240,105 B2
(45) Date of Patent: Mar. 4, 2025

(54) DYNAMIC MASS ESTIMATION METHODS FOR AN INTEGRATED MOBILE MANIPULATOR ROBOT

(71) Applicant: Boston Dynamics, Inc., Waltham, MA (US)

(72) Inventors: Shervin Talebi, Wayland, MA (US); Neil Neville, Waltham, MA (US); Kevin Blankespoor, Arlington, MA (US)

(73) Assignee: BOSTON DYNAMICS, INC., Waltham, MA (US)

( * ) Notice: Subject to any disclaimer, the term of this patent is extended or adjusted under 35 U.S.C. 154(b) by 306 days.

(21) Appl. No.: 17/699,523

(22) Filed: Mar. 21, 2022

(65) Prior Publication Data

US 2022/0305678 A1    Sep. 29, 2022

Related U.S. Application Data

(60) Provisional application No. 63/166,851, filed on Mar. 26, 2021.

(51) Int. Cl.
*B25J 19/02* (2006.01)
*B25J 9/16* (2006.01)
(Continued)

(52) U.S. Cl.
CPC ............. *B25J 19/02* (2013.01); *B25J 9/1664* (2013.01); *B65G 61/00* (2013.01); *G01G 9/00* (2013.01); *G01G 19/14* (2013.01)

(58) Field of Classification Search
CPC . B25J 19/02; B25J 9/1664; B25J 9/162; B25J 9/1638; B25J 9/1653; B65G 61/00;
(Continued)

(56) References Cited

U.S. PATENT DOCUMENTS

| 4,789,295 A | 12/1988 | Boucher, Jr. et al. |
| 6,588,574 B2 | 7/2003 | Koini et al. |

(Continued)

FOREIGN PATENT DOCUMENTS

| EP | 3 482 884 A1 | 5/2019 |
| RU | 2575184 C1 * | 2/2016 |

(Continued)

OTHER PUBLICATIONS

Aleksandrova M Yu, RU 2575184 C1 (RU 2014143855 A) translation, Method to Determine Body Inertia Tensor, Oct. 30, 2014, Federal'Noe Gosudarstvennoe Bjudzhetnoe Uchrezhdenie (Year: 2014).*

(Continued)

*Primary Examiner* — Adam R Mott
*Assistant Examiner* — Heather J Keniry
(74) *Attorney, Agent, or Firm* — PIERCE ATWOOD LLP

(57) ABSTRACT

A method of estimating one or more mass characteristics of a payload manipulated by a robot includes moving the payload using the robot, determining one or more accelerations of the payload while the payload is in motion, sensing, using one or more sensors of the robot, a wrench applied to the payload while the payload is in motion, and estimating the one or more mass characteristics of the payload based, at least in part, on the determined accelerations and the sensed wrench.

29 Claims, 10 Drawing Sheets

(51) Int. Cl.
*B65G 61/00* (2006.01)
*G01C 19/14* (2006.01)
*G01G 9/00* (2006.01)
*G01G 19/14* (2006.01)

(58) Field of Classification Search
CPC .............. G01G 9/00; G01G 19/14; G05B 2219/37621; G05B 2219/39529; G05B 2219/40298; G05B 2219/40586; G01C 19/14
See application file for complete search history.

(56) References Cited

U.S. PATENT DOCUMENTS

| | | |
|---|---|---|
| 7,153,085 B2 | 12/2006 | Clark et al. |
| 8,295,980 B2 | 10/2012 | Williamson |
| 8,965,563 B2 | 2/2015 | Eldershaw et al. |
| 9,004,846 B2 | 4/2015 | La Rovere et al. |
| 9,089,969 B1 | 7/2015 | Theobald |
| 9,102,053 B2 | 8/2015 | Suzuki |
| 9,233,470 B1 | 1/2016 | Bradski et al. |
| 9,242,380 B2* | 1/2016 | Komatsu ............... B25J 13/085 |
| 9,272,417 B2 | 3/2016 | Konolige et al. |
| 9,434,558 B2 | 9/2016 | Criswell |
| 9,451,810 B2 | 9/2016 | Regan et al. |
| 9,481,530 B2 | 11/2016 | Brandmüller et al. |
| 9,487,361 B2 | 11/2016 | Girtman et al. |
| 9,493,316 B2 | 11/2016 | Girtman et al. |
| 9,503,704 B2 | 11/2016 | Ando |
| 9,519,882 B2 | 12/2016 | Galluzzo et al. |
| 9,604,363 B2 | 3/2017 | Ban |
| 9,630,316 B2 | 4/2017 | Konolige et al. |
| 9,688,489 B1 | 6/2017 | Zevenbergen et al. |
| 9,744,669 B2 | 8/2017 | Wicks et al. |
| 9,875,911 B2 | 1/2018 | Pagaila et al. |
| 9,919,872 B2 | 3/2018 | Khodl et al. |
| 9,940,604 B2 | 4/2018 | Galluzzo et al. |
| 9,969,573 B2 | 5/2018 | Girtman et al. |
| 9,987,746 B2 | 6/2018 | Bradski et al. |
| 10,005,627 B2 | 6/2018 | Girtman et al. |
| 10,071,856 B2 | 9/2018 | Hance et al. |
| 10,108,185 B1 | 10/2018 | Theobald |
| 10,122,995 B2 | 11/2018 | Rublee et al. |
| 10,124,489 B2 | 11/2018 | Chitta et al. |
| 10,124,967 B2 | 11/2018 | Girtman et al. |
| 10,147,069 B2 | 12/2018 | Galluzzo et al. |
| 10,216,865 B1 | 2/2019 | Theobald |
| 10,239,210 B2 | 3/2019 | Morency et al. |
| 10,343,857 B2 | 7/2019 | Morency et al. |
| 10,417,521 B2 | 9/2019 | Dong |
| 10,518,973 B2 | 12/2019 | Hance et al. |
| 10,661,444 B2 | 5/2020 | McCollum et al. |
| 10,766,149 B2 | 9/2020 | Marchese et al. |
| 10,793,047 B1 | 10/2020 | Theobald |
| 2006/0182607 A1 | 8/2006 | Clark et al. |
| 2007/0142823 A1* | 6/2007 | Prisco .................. B25J 9/1638 606/1 |
| 2013/0017053 A1 | 1/2013 | Forget et al. |
| 2014/0079524 A1 | 3/2014 | Shimono et al. |
| 2014/0230581 A1* | 8/2014 | Nakatani .............. B25J 13/085 73/865 |
| 2015/0066199 A1 | 3/2015 | Shimono |
| 2016/0178430 A1* | 6/2016 | Holcomb .............. G01L 5/009 177/245 |
| 2016/0221187 A1 | 8/2016 | Bradski et al. |
| 2018/0104825 A1 | 4/2018 | Vulcano et al. |
| 2018/0222695 A9 | 8/2018 | Girtman et al. |
| 2018/0370021 A1* | 12/2018 | Asada .................. B25J 9/0006 |
| 2019/0321977 A1* | 10/2019 | Tan ...................... B25J 9/162 |
| 2020/0094401 A1* | 3/2020 | Cheng ................... B25J 9/163 |
| 2020/0130961 A1* | 4/2020 | Diankov ............... B25J 9/1687 |
| 2020/0171673 A1 | 6/2020 | Moosman et al. |
| 2020/0306964 A1* | 10/2020 | Neville ................. B65G 57/08 |
| 2021/0291371 A1* | 9/2021 | Yoshiura ............... B25J 9/023 |
| 2022/0371195 A1* | 11/2022 | Lee ...................... B25J 13/08 |

FOREIGN PATENT DOCUMENTS

| | | |
|---|---|---|
| WO | 1998051598 A1 | 11/1998 |
| WO | 2014041318 A1 | 3/2014 |
| WO | 2014111633 A1 | 7/2014 |
| WO | 2014113762 A1 | 7/2014 |
| WO | 2014186781 A1 | 11/2014 |
| WO | 2015017444 A1 | 2/2015 |
| WO | 2015035300 A1 | 3/2015 |
| WO | 2015187975 A1 | 12/2015 |
| WO | 2016014917 A1 | 1/2016 |
| WO | 2016033172 A1 | 3/2016 |
| WO | 2017146895 A1 | 8/2017 |
| WO | 2018022265 A1 | 2/2018 |
| WO | 2019238940 A1 | 12/2019 |
| WO | 2010034044 A2 | 4/2020 |

OTHER PUBLICATIONS

International Preliminary Report on Patentability for International Application No. PCT/US2022/021076 dated Sep. 12, 2023; 17 pages.

Swevers J et al: "Dynamic Model Identification for Industrial Robots", IEEE Control Systems Magazine, IEEE Service Center, Piscataway, NJ, US, vol. 27, No. 5, Oct. 1, 2007 (Oct. 1, 2007), pp. 58-71.

Bruno Siciliano et al: "Robotics—Differential Kinematics and Statics—Chapter 3" In: "Robotics—Differential Kinematics and Statics—Chapter 3", Dec. 23, 2009 (Dec. 23, 2009).

Mavrakis Nikos et al: "Estimation and exploitation of objects ' inertial parameters in robotic grasping and manipulation: A survey", Robotics and Autonomous Systems, Elsevier BV, Amsterdam, NL, vol. 124, Nov. 19, 2019 (Nov. 19, 2019).

International Search Report and Written Opinion for International Application No. PCT/US2022/021076 dated Sep. 5, 2022.

* cited by examiner

DYNAMIC MASS ESTIMATION METHODS FOR AN INTEGRATED MOBILE MANIPULATOR ROBOT

CROSS-REFERENCE TO RELATED APPLICATIONS

This application claims priority under 35 U.S.C. § 119(e) to U.S. Provisional Application Ser. No. 63/166,851, filed Mar. 26, 2021, titled, "DYNAMIC MASS ESTIMATION METHODS FOR AN INTEGRATED MOBILE MANIPULATOR ROBOT," which is incorporated by reference in its entirety herein.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transportation, hazardous environments, exploration, and healthcare.

SUMMARY

Some embodiments relate to a method of estimating one or more mass characteristics of a payload manipulated by a robot. The method comprises moving the payload using the robot, determining one or more accelerations of the payload while the payload is in motion, sensing (using one or more sensors of the robot) a wrench applied to the payload while the payload is in motion, and estimating the one or more mass characteristics of the payload based, at least in part, on the determined accelerations and the sensed wrench.

In one aspect, determining the one or more accelerations of the payload while the payload is in motion comprises determining the one or more accelerations of the payload while the payload is moved through an excitation routine, and sensing the wrench applied to the payload while the payload is in motion comprises sensing the wrench applied to the payload while the payload is moved through the excitation routine. In another aspect, determining the one or more accelerations of the payload comprises determining the one or more accelerations of the payload based, at least in part, on one or more motions of the robot. In another aspect, determining the one or more accelerations of the payload based, at least in part, on the one or more motions of the robot comprises determining one or more joint motions of a robotic arm of the robot, and determining one or more accelerations of the robotic arm based, at least in part, on the one or more determined joint motions and a kinematic model of the robotic arm. In another aspect, determining the one or more accelerations of the payload based, at least in part, on the one or more motions of the robot comprises determining the accelerations of the payload based, at least in part, on the one or more motions of a robotic arm of the robot and motion of a mobile base of the robot, wherein the robotic arm is operatively coupled to the mobile base.

In one aspect, sensing the wrench comprises sensing the wrench applied to the payload by an end effector of a robotic arm of the robot. In another aspect, sensing the wrench comprises sensing a wrench associated with a wrist of a robotic arm of the robot. In another aspect, sensing the wrench associated with the wrist of the robotic arm comprises sensing the wrench using a 6-axis force/torque sensor.

In one aspect, estimating the one or more mass characteristics of the payload comprises estimating one or more of a mass of the payload, a center of mass of the payload, and one or more moments of inertia of the payload. In another aspect, estimating the one or more mass characteristics of the payload comprises estimating at least ten mass characteristics, wherein the at least ten mass characteristics comprise one mass parameter, three center of mass parameters, and six moment of inertia parameters. In another aspect, estimating the one or more mass characteristics of the payload comprises estimating the one or more mass characteristics of the payload within a time period of less than 0.5 seconds. In another aspect, estimating the one or more mass characteristics of the payload comprises estimating the one or more mass characteristics of the payload based, at least in part, on one or more priors. In another aspect, estimating the one or more mass characteristics of the payload based, at least in part, on the one or more priors comprises estimating the one or more mass characteristics of the payload based, at least in part, on one or more physical dimensions of the payload.

Some embodiments relate to a method of planning a trajectory. The method comprises estimating one or more mass characteristics of a payload according to one or more of the techniques described herein, computing inverse dynamics of the payload based, at least in part, on the estimated one or more mass characteristics of the payload, and planning the trajectory based, at least in part, on the computed inverse dynamics. In one aspect, computing the inverse dynamics comprises computing one or more torques to be applied at one or more joints of a robotic arm of the robot. In another aspect, planning the trajectory comprises optimizing the trajectory based, at least in part, on the estimated one or more mass characteristics of the payload. In another aspect, optimizing the trajectory comprises optimizing one or more of a speed of the payload and an acceleration of the payload. In another aspect, optimizing the trajectory includes minimizing the applied wrench required to displace the payload.

Some embodiments relate to a robot comprising a robotic arm, one or more sensors, and a controller. The controller is configured to determine one or more accelerations of a payload manipulated by the robot while the payload is in motion, determine a wrench applied to the payload while the payload is in motion based on signals from the one or more sensors, and estimate one or more mass characteristics of the payload based, at least in part, on the determined accelerations and the determined wrench.

In one aspect, the controller is configured to determine the one or more accelerations of the payload while the payload is moved through an excitation routine, and the controller is configured to determine the wrench applied to the payload while the payload is moved through the excitation routine. In another aspect, the robot further comprises a mobile base, wherein the robotic arm is operatively coupled to the mobile base. In another aspect, the controller is further configured to determine one or more joint motions of the robotic arm, and determine one or more accelerations of the robotic arm based, at least in part, on the one or more determined joint motions and a kinematic model of the robotic arm. In another aspect, the robot further comprises an end effector operatively coupled to a distal portion of the robotic arm, wherein the controller is configured to determine a wrench applied to the payload by the end effector. In another aspect, the one or more sensors are configured to sense a wrench associated with a wrist of the robotic arm. In another aspect, the one or more sensors comprise a 6-axis force/torque sensor. In another aspect, the controller is configured to estimate one or more of a mass of the payload, a center of mass of the payload, and one or more moments of inertia of the payload. In another aspect, the controller is configured to estimate at least ten mass characteristics, wherein the at least ten mass characteristics comprise one mass parameter, three center of mass parameters, and six moment of inertia parameters.

Some embodiments relate to a method of manipulating an object using a robot. The method comprises planning a trajectory of the object, moving the object along the trajectory using the robot, estimating one or more mass characteristics of the object while the object is in motion along the trajectory, and modifying an operation of the robot based, at least in part, on the estimated one or more mass characteristics.

In one aspect, planning the trajectory of the object comprises planning a first trajectory of the object, and modifying the operation of the robot comprises planning a second trajectory of the object different from the first trajectory of the object. In another aspect, planning the second trajectory comprises planning the second trajectory based, at least in part, on inverse dynamics computed using the estimated one or more mass characteristics. In another aspect, planning the second trajectory comprises planning the second trajectory to limit a wrench applied to the object by the robot within a predetermined range. In another aspect, modifying the operation of the robot comprises adjusting a motion of a robotic arm of the robot. In another aspect, adjusting the motion of the robotic arm comprises adjusting one or more torques applied at one or more joints of the robotic arm. In another aspect, modifying the operation of the robot comprises adjusting a motion of a mobile base of the robot. In another aspect, modifying the operation of the robot comprises adjusting a motion of a robotic arm of the robot and adjusting a motion of a mobile base of the robot, wherein the robotic arm is operatively coupled to the mobile base. In another aspect, estimating the one or more mass characteristics of the object comprises estimating one or more of a mass of the object, a center of mass of the object, and one or more moments of inertia of the object. In another aspect, estimating the one or more mass characteristics of the object comprises estimating at least ten mass characteristics, wherein the at least ten mass characteristics comprise one mass parameter, three center of mass parameters, and six moment of inertia parameters.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
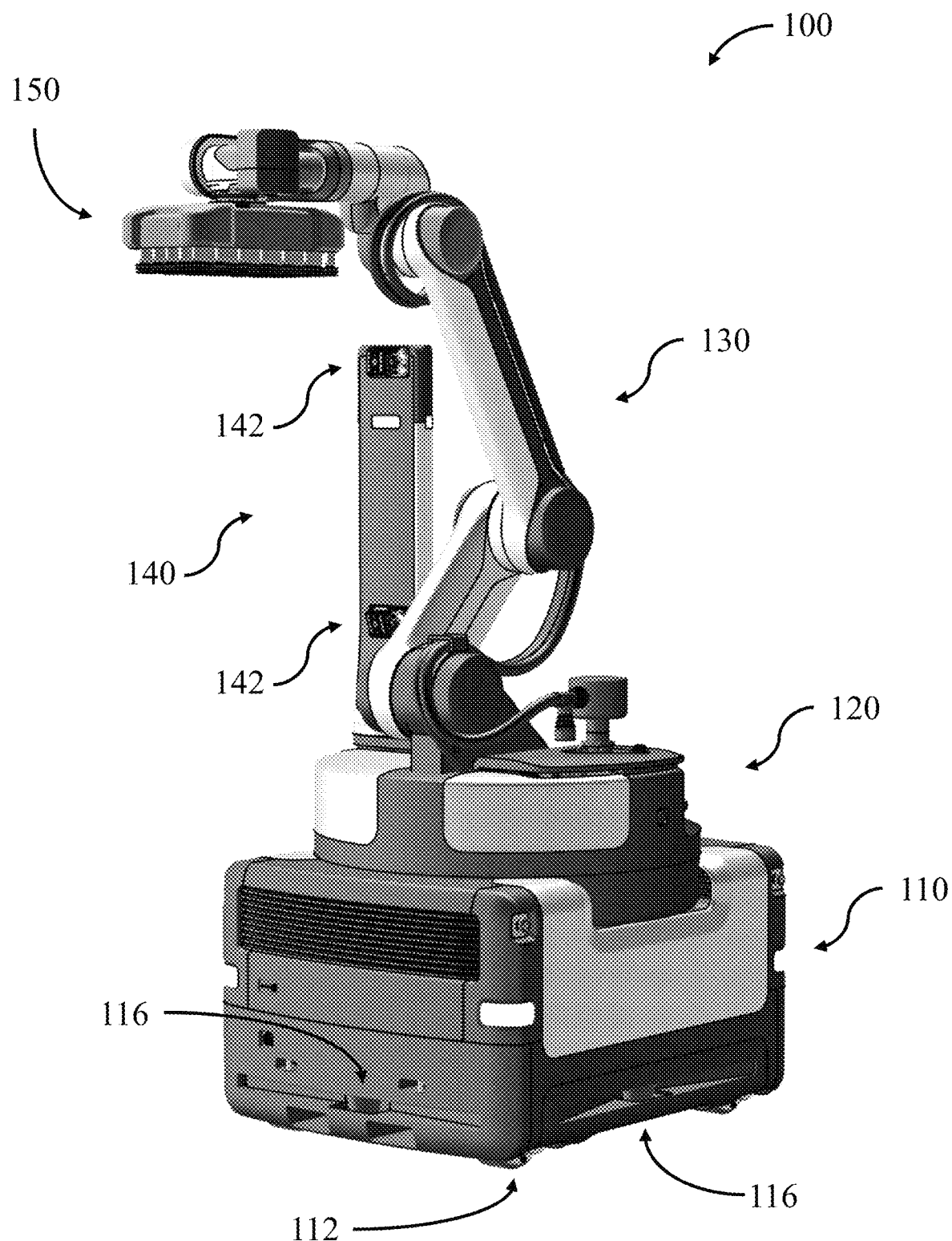
FIG. 1A is a perspective view of one embodiment of a robot.

Robots are typically configured to perform various tasks in an environment in which they are placed. Generally, these tasks include interacting with objects and/or the elements of the environment. Notably, robots are becoming popular in warehouse and logistics operations. Before the introduction of robots to such spaces, many operations were performed manually. For example, a person might manually unload boxes from a truck onto one end of a conveyor belt, and a second person at the opposite end of the conveyor belt might organize those boxes onto a pallet. The pallet may then be picked up by a forklift operated by a third person, who might drive to a storage area of the warehouse and drop the pallet for a fourth person to remove the individual boxes from the pallet and place them on shelves in the storage area. More recently, robotic solutions have been developed to automate many of these functions. Such robots may either be specialist robots (i.e., designed to perform a single task, or a small number of closely related tasks) or generalist robots (i.e., designed to perform a wide variety of tasks). To date, both specialist and generalist warehouse robots have been associated with significant limitations, as explained below.

A specialist robot may be designed to perform a single task, such as unloading boxes from a truck onto a conveyor belt. While such specialized robots may be efficient at performing their designated task, they may be unable to perform other, tangentially related tasks in any capacity. As such, either a person or a separate robot (e.g., another specialist robot designed for a different task) may be needed to perform the next task(s) in the sequence. As such, a warehouse may need to invest in multiple specialized robots to perform a sequence of tasks, or may need to rely on a hybrid operation in which there are frequent robot-to-human or human-to-robot handoffs of objects.

In contrast, a generalist robot may be designed to perform a wide variety of tasks, and may be able to take a box through a large portion of the box's life cycle from the truck to the shelf (e.g., unloading, palletizing, transporting, depalletizing, storing). While such generalist robots may perform a variety of tasks, they may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible. Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task. As should be appreciated from the foregoing, the mobile base and the manipulator in such systems are effectively two separate robots that have been joined together; accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while there are limitations that arise from a purely engineering perspective, there are additional limitations that must be imposed to comply with safety regulations. For instance, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not a pose a threat to the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, the inventors have recognized and appreciated that a highly integrated mobile manipulator robot with system-level mechanical design and holistic control strategies between the manipulator and the mobile base may be associated with certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

Furthermore, the inventors have recognized and appreciated that even more complex and/or dynamic motions may be achievable if certain mass properties of a payload (e.g., of an object manipulated by the robotic arm) can be estimated. Without wishing to be bound by theory, the speed at which a payload may be moved (and/or the degree to which a payload may be accelerated) by a robotic arm before the payload separates from the robotic arm may depend, at least in part, on the mass properties of the payload. Accordingly, a payload may be moved at greater speeds and/or accelerations if certain mass information of the payload is known. Robots that employ some conventional mass estimation methods require the robot to stop moving to keep the payload stationary while the mass properties of the payload are measured. The inventors have recognized that requiring the robot to stop moving while mass properties of a payload are measured increases the amount of time needed to move the payload compared to scenarios in which mass estimation is performed "on-the-fly" without requiring the motion of the robot to be stopped. To this end, some embodiments relate to a "dynamic" mass estimation technique in which mass properties of a payload are estimated as the payload is moved in an accelerated state. Accordingly, these dynamic mass estimation methods (and the associated path planning and trajectory optimization that are thereby enabled) may be associated with increased speed and/or efficiency for certain manipulation tasks, as described in greater detail below.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
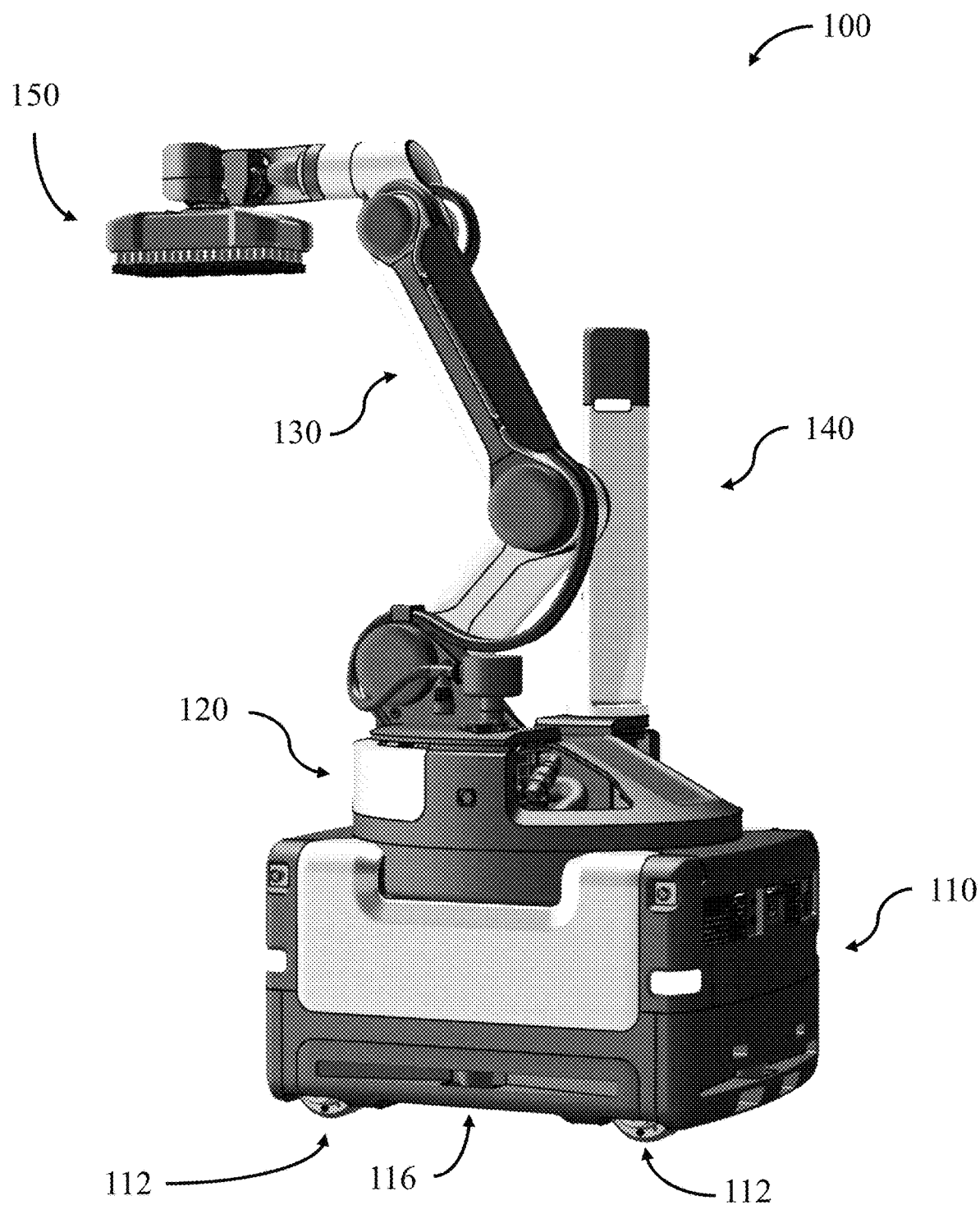
FIG. 1B is another perspective view of the robot of FIG. 1A.

FIGS. 1A and 1B are perspective views of one embodiment of a robot 100. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
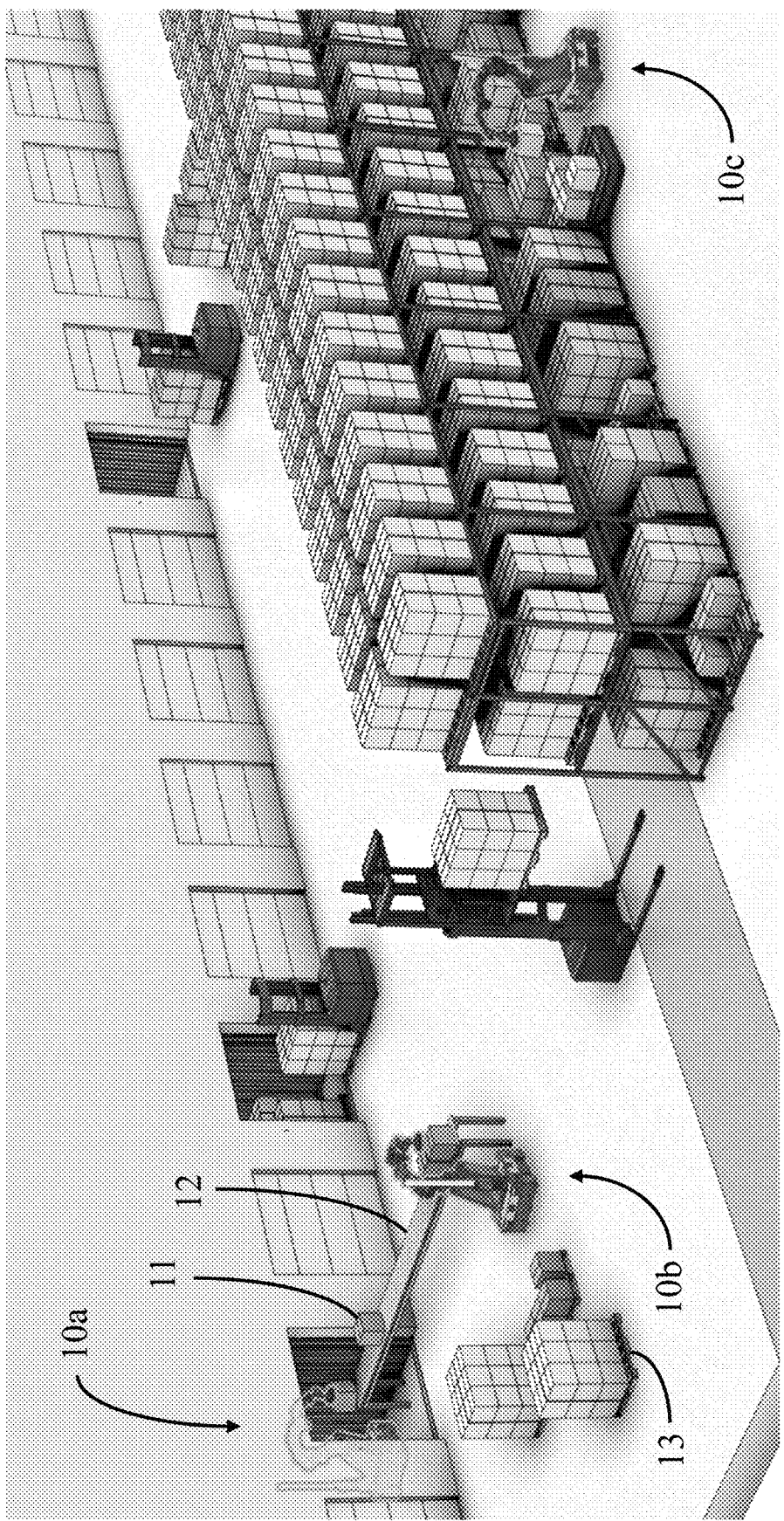
FIG. 2A depicts robots performing tasks in a warehouse environment.

FIG. 2A depicts robots 10a, 10b, and 10c performing different tasks within a warehouse environment. A first robot 10a is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10b organizes the boxes 11 onto a pallet 13. In a separate area of the warehouse, a third robot 10c picks boxes from shelving to build an order on a pallet (this particular task will be discussed in greater detail below in reference to FIG. 2C). It should be appreciated that the robots 10a, 10b, and 10c are different instances of the same robot (or of highly similar robots). Accordingly, the robots described herein may be understood as specialized multi-purpose robots, in that they are designed to perform specific tasks accurately and efficiently, but are not limited to only one or a small number of specific tasks.

Figure 2B:
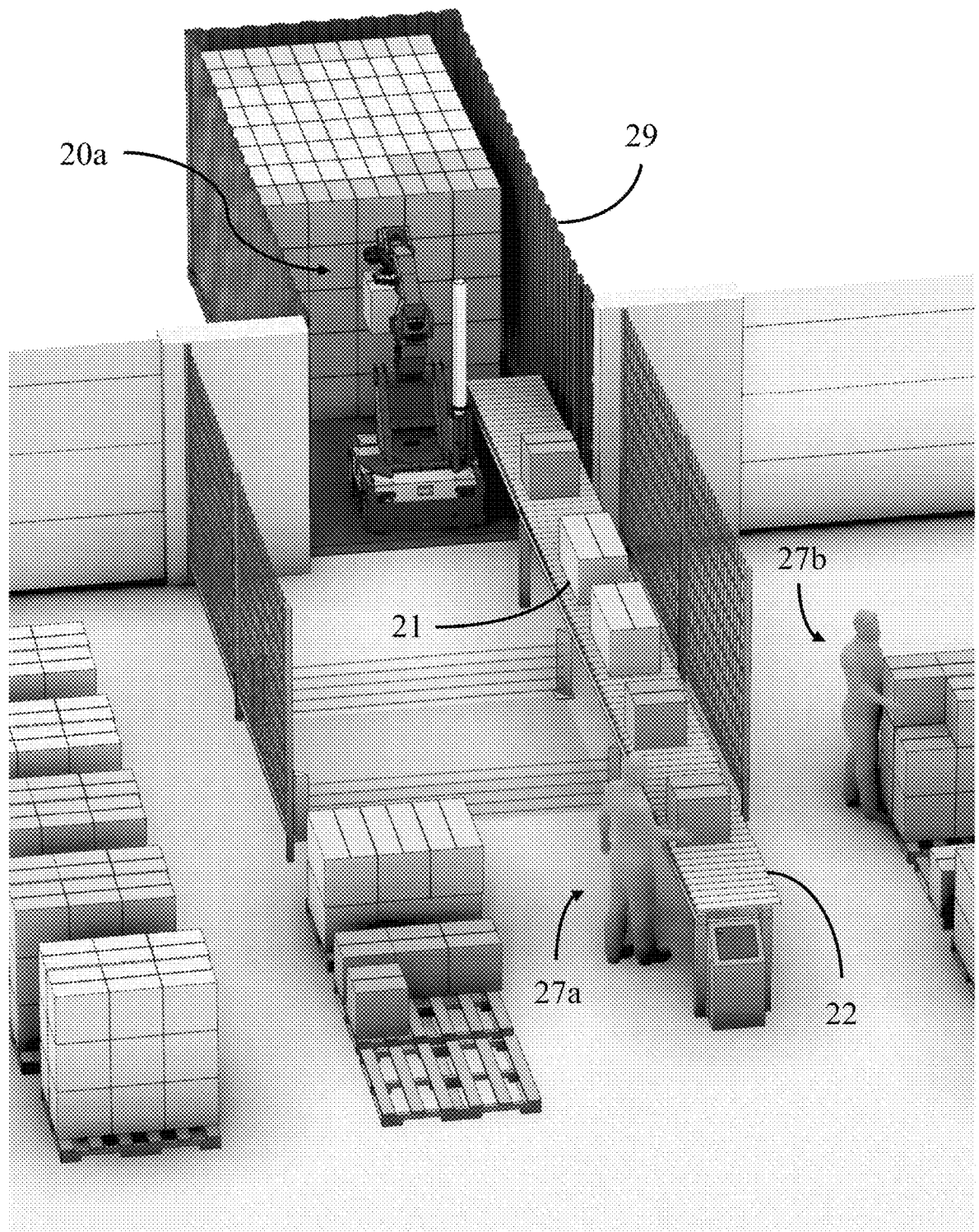
FIG. 2B depicts a robot unloading boxes from a truck.

FIG. 2B depicts a robot 20a unloading boxes 21 from a truck 29 and placing them on a conveyor belt 22. In this box picking application (as well as in other box picking applications), the robot 20a will repetitiously pick a box, rotate, place the box, and rotate back to pick the next box. Although robot 20a of FIG. 2B is a different embodiment from robot 100 of FIGS. 1A and 1B, referring to the components of robot 100 identified in FIGS. 1A and 1B will ease explanation of the operation of the robot 20a in FIG. 2B. During operation, the perception mast of robot 20a (analogous to the perception mast 140 of robot 100 of FIGS. 1A and 1B) may be configured to rotate independent of rotation of the turntable (analogous to the turntable 120) on which it is mounted to enable the perception modules (akin to perception modules 142) mounted on the perception mast to capture images of the environment that enable the robot 20a to plan its next movement while simultaneously executing a current movement. For example, while the robot 20a is picking a first box from the stack of boxes in the truck 29, the perception modules on the perception mast may point at and gather information about the location where the first box is to be placed (e.g., the conveyor belt 22). Then, after the turntable rotates and while the robot 20a is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20a may parallelize tasks which may otherwise have been performed sequentially, thus enabling faster and more efficient operation.

Also of note in FIG. 2B is that the robot 20a is working alongside humans (e.g., workers 27a and 27b). Given that the robot 20a is configured to perform many tasks that have traditionally been performed by humans, the robot 20a is designed to have a small footprint, both to enable access to areas designed to be accessed by humans, and to minimize the size of a safety zone around the robot into which humans are prevented from entering.

Figure 2C:
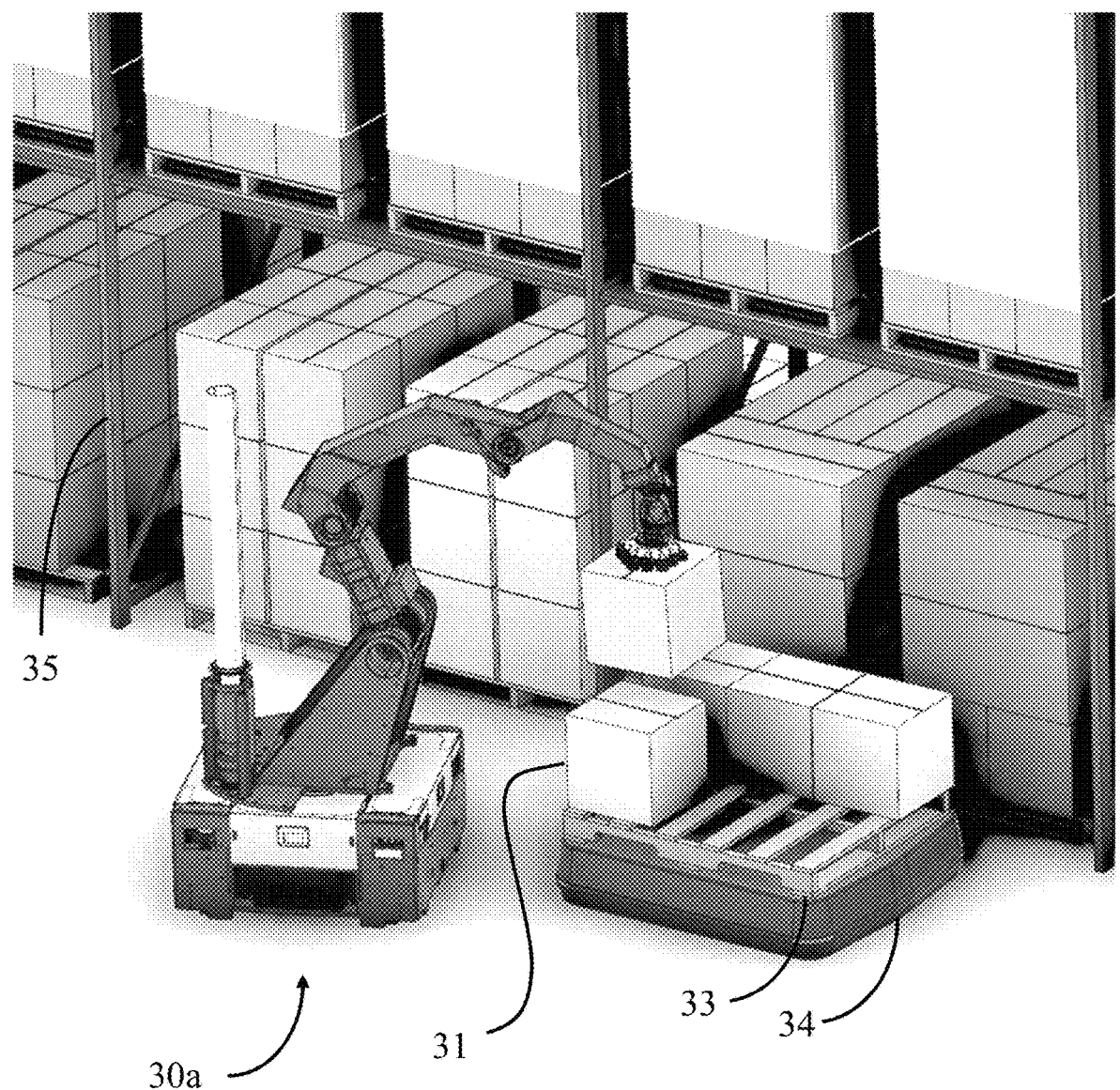
FIG. 2C depicts a robot building a pallet in a warehouse aisle.

FIG. 2C depicts a robot 30a performing an order building task, in which the robot 30a places boxes 31 onto a pallet 33. In FIG. 2C, the pallet 33 is disposed on top of an autonomous mobile robot (AMR) 34, but it should be appreciated that the capabilities of the robot 30a described in this example apply to building pallets not associated with an AMR. In this task, the robot 30a picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

Of course, it should be appreciated that the tasks depicted in FIGS. 2A-2C are but a few examples of applications in which an integrated mobile manipulator robot may be used, and the present disclosure is not limited to robots configured to perform only these specific tasks. For example, the robots described herein may be suited to perform tasks including, but not limited to, removing objects from a truck or container, placing objects on a conveyor belt, removing objects from a conveyor belt, organizing objects into a stack, organizing objects on a pallet, placing objects on a shelf, organizing objects on a shelf, removing objects from a shelf, picking objects from the top (e.g., performing a "top pick"), picking objects from a side (e.g., performing a "face pick"), coordinating with other mobile manipulator robots, coordinating with other warehouse robots (e.g., coordinating with AMRs), coordinating with humans, and many other tasks.

Example Robotic Arm

Figure 3:
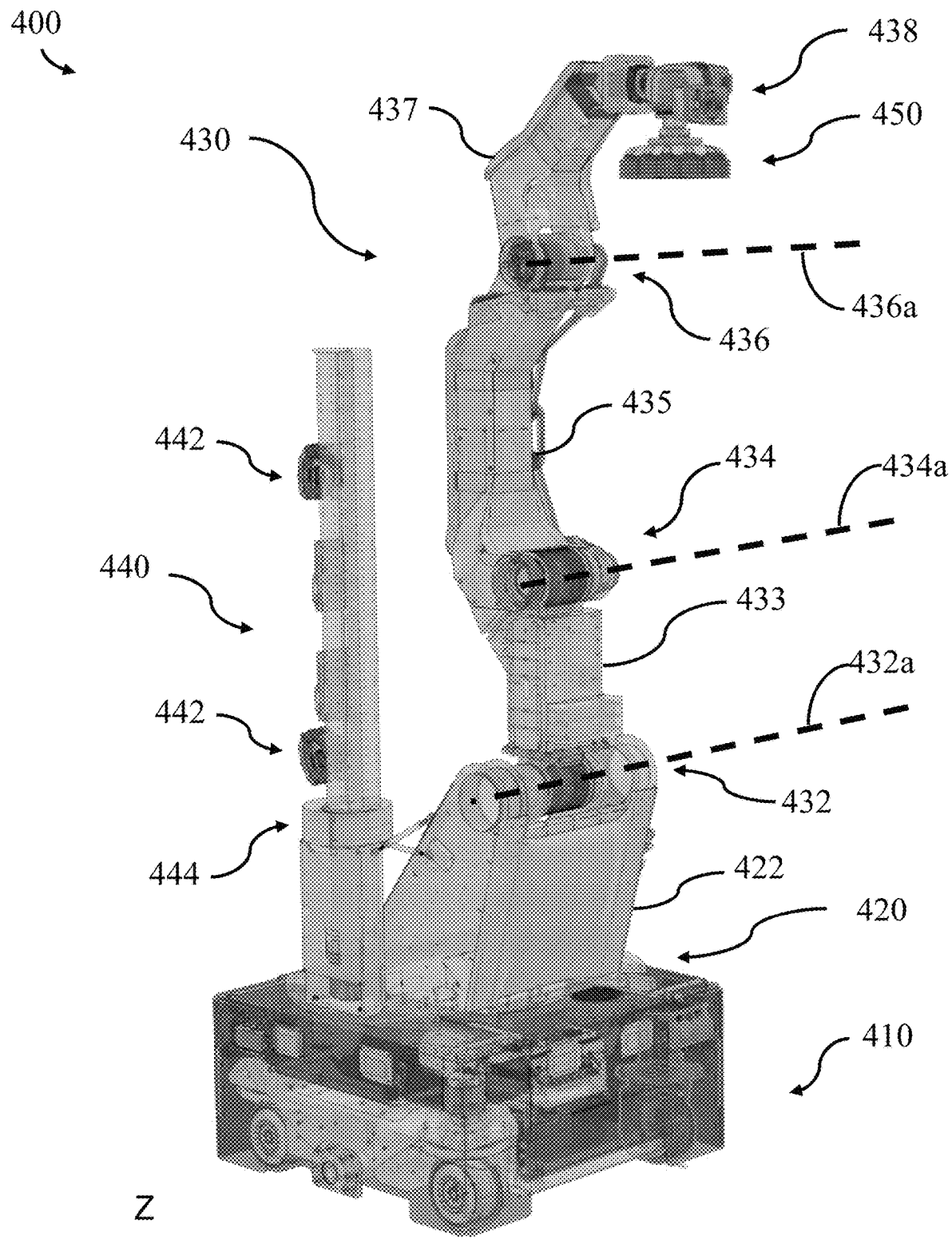
FIG. 3 is a perspective view of one embodiment of a robot.

FIG. 3 is a perspective view of a robot 400 designed in accordance with some embodiments. The robot 400 includes a mobile base 410 and a turntable 420 rotatably coupled to the mobile base. A robotic arm 430 is operatively coupled to the turntable 420, as is a perception mast 440. The perception mast 440 includes an actuator 444 configured to enable rotation of the perception mast 440 relative to the turntable 420 and/or the mobile base 410, so that a direction of the perception modules 442 of the perception mast may be independently controlled.

The robotic arm 430 of FIG. 3 is a 6-DOF robotic arm. When considered in conjunction with the turntable 420 (which is configured to yaw relative to the mobile base about a vertical axis parallel to the Z axis), the arm/turntable system may be considered a 7-DOF system. The 6-DOF robotic arm 430 includes three pitch joints 432, 434, and 436, and a 3-DOF wrist 438 which, in some embodiments, may be a spherical 3-DOF wrist. Starting at the turntable 420, the robotic arm 430 includes a turntable offset 422 which is fixed relative to the turntable 420. A distal portion of the turntable offset 422 is rotatably coupled to a proximal portion of a first link 433 at a first joint 432. A distal portion of the first link 433 is rotatably coupled to a proximal portion of a second link 435 at a second joint 434. A distal portion of the second link 435 is rotatably coupled to a proximal portion of a third link 437 at a third joint 436. The first, second, and third joints 432, 434, and 436 are associated with first, second, and third axes 432a, 434a, and 436a, respectively. The first, second, and third joints 432, 434, and 436 are additionally associated with first, second, and third actuators (not labeled) which are configured to rotate a link about an axis. Generally, the nth actuator is configured to rotate the nth link about the nth axis associated with the nth joint. Specifically, the first actuator is configured to rotate the first link 433 about the first axis 432a associated with the first joint 432, the second actuator is configured to rotate the second link 435 about the second axis 434a associated with the second joint 434, and the third actuator is configured to rotate the third link 437 about the third axis 436a associated with the third joint 436. In the embodiment shown in FIG. 3, the first, second, and third axes 432a, 434a, and 436a are parallel (and, in this case, are all parallel to the X axis). In the embodiment shown in FIG. 3, the first, second, and third joints 432, 434, and 436 are all pitch joints.

In some embodiments, a robotic arm of a highly integrated mobile manipulator robot may include a different number of degrees of freedom than the robotic arms discussed above. Additionally, a robotic arm need not be limited to a robotic arm with three pitch joints and a 3-DOF wrist. It should be appreciated that a robotic arm of a highly integrated mobile manipulator robot may include any suitable number of joints of any suitable type, whether revolute or prismatic. Revolute joints need not be oriented as pitch joints, but rather may be pitch, roll, yaw, or any other suitable type of joint.

Returning to FIG. 3, the robotic arm 430 includes a wrist 438. As noted above, the wrist 438 is a 3-DOF wrist, and in some embodiments may be a spherical 3-DOF wrist. The wrist 438 is coupled to a distal portion of the third link 437. The wrist 438 includes three actuators configured to rotate an end effector 450 coupled to a distal portion of the wrist 438 about three mutually perpendicular axes. Specifically, the wrist may include a first wrist actuator configured to rotate the end effector relative to a distal link of the arm (e.g., the third link 437) about a first wrist axis, a second wrist actuator configured to rotate the end effector relative to the distal link about a second wrist axis, and a third wrist actuator configured to rotate the end effector relative to the distal link about a third wrist axis. The first, second, and third wrist axes may be mutually perpendicular. In embodiments in which the wrist is a spherical wrist, the first, second, and third wrist axes may intersect.

In the embodiment of FIG. 3, the end effector 450 is a vacuum-based end effector. In embodiments in which the end effector is a vacuum-based end effector, the end effector may include multiple vacuum assemblies that attach to an object by applying a suction force through a suction cup. The vacuum assemblies may be individually addressable, such that a controller may adjust a level of suction of each vacuum assembly independently. For example, each vacuum assembly may include a sensor (such as a pressure sensor) to determine a grip quality between the vacuum assembly and the object being grasped. If it is determined that some vacuum assemblies are insufficiently attached to the object (e.g., due to a poor suction cup seal), those vacuum assemblies may be turned off such that the total vacuum pressure of the end effector may be distributed among only the vacuum assemblies with a good seal, reducing the amount of vacuum pressure that is wasted.

In some embodiments, an end effector may be associated with one or more sensors. For example, a force/torque sensor may measure forces and/or torques (e.g., wrenches) applied to the end effector. Alternatively or additionally, a sensor may measure wrenches applied to a wrist of the robotic arm by the end effector (and, for example, an object grasped by the end effector) as the object is manipulated. Signals from these (or other) sensors may be used during mass estimation and/or path planning operations, as will be explained below. In some embodiments, sensors associated with an end effector may include an integrated force/torque sensor, such as a 6-axis force/torque sensor. In some embodiments, separate sensors (e.g., separate force and torque sensors) may be employed. Some embodiments may include only force sensors (e.g., uniaxial force sensors, or multi-axis force sensors), and some embodiments may include only torque sensors. In some embodiments, an end effector may be associated with a custom sensing arrangement. For example, one or more sensors (e.g., one or more uniaxial sensors) may be arranged to enable sensing of forces and/or torques along multiple axes. An end effector (or another portion of the robotic arm) may additionally include any appropriate number or configuration of cameras, distance sensors, pressure sensors, light sensors, or any other suitable sensors, whether related to sensing characteristics of the payload or otherwise, as the disclosure is not limited in this regard.

As noted briefly above, the inventors have recognized and appreciated that knowledge of certain mass properties of a payload to be manipulated by a robotic arm may enable more complex and/or more dynamic motions. Accordingly, the ability to quickly and accurately estimate certain payload mass properties may be associated with certain benefits related to payload manipulation, as will be explained in greater detail below.

For many applications of a robotic arm, it may be advantageous to move a payload as quickly as possible. However, it may be undesirable to move the payload at such high velocities and/or accelerations that an end effector of the manipulator is unable to maintain its hold on the payload. Without wishing to be bound by theory, the velocity and/or acceleration at which a payload may separate from an end effector may depend at least in part on the mass of the payload (e.g., light payloads may be able to be manipulated at higher velocities and/or accelerations compared to heavy payloads). If the mass of the payload is known, trajectories may be optimized such that the payload may be moved as fast as possible (within a safety factor) without separating from the end effector. Accordingly, being able to estimate the mass of a payload may be associated with certain benefits relating to the speed and efficiency of manipulation tasks.

Robust mass estimation may be particularly advantageous for advanced robotic manipulators that are designed to be small and light, while still being able to manipulate heavy loads. For example, a highly integrated mobile manipulation robot may be designed to include a relative lightweight robotic arm, and may still be tasked with moving heavy boxes. As such, the mass of a payload may be an appreciable percentage of the mass of the robotic arm (or even of the entire robot). Accordingly, for such robots, it may be additionally advantageous to be able to estimate payload mass properties accurately.

Conventional methods of payload mass estimation using a robotic arm often include supporting the payload with the end effector in an unaccelerated state (e.g., stationary, or moving at a constant velocity) in order to weigh the payload. For example, a signal from a force sensor associated with the end effector may be indicative of the force exerted on the end effector by the payload. If the payload is held stationary (or moved at a constant velocity), the only force exerted on the end effector by the payload may be the weight of the payload. Accordingly, the weight of the payload may be estimated based on the signal from a force sensor associated with the end effector.

However, for such conventional approaches to be able to accurately predict mass properties of the payload, the only force acting on the payload should be the force of gravity. That is, if the payload is accelerated (e.g., moved dynamically by the robotic arm), the resulting inertial forces may compromise the accuracy of such conventional mass estimation methods. Thus, to ensure that the mass estimates are accurate, such conventional mass estimation methods require that the payload be held stationary (or moved at a constant velocity) for a period of time. Of course, if an arm must remain stationary for a dedicated period of time, there may be associated limitations on the overall speed and/or efficiency with which the robotic arm may accomplish the manipulation task.

Another limitation of some conventional mass estimation methods is that they may only be able to estimate a single value representing the payload mass. Other mass properties of the payload, such as the location of the center of mass or various moments of inertia, may not be able to be estimated using such approaches.

In view of the above, the inventors have recognized and appreciated that there may be benefits associated with dynamic mass estimation methods that allow estimation of payload mass characteristics as the payload is dynamically manipulated. Such methods may enable mass estimation to occur while the payload is in motion (e.g., in accelerated states), and may not require that the payload be held stationary, resulting in more efficient operation. In some embodiments, such dynamic mass estimation methods enable estimation of additional mass properties including the center of mass and/or the moments of inertia, which may advantageously enable more robust path planning and/or trajectory optimization.

Without wishing to be bound by theory, dynamic equations relate the mass of an object to the forces and accelerations experienced by the object. A standard formulation of Newton's second law expresses the total force applied to a body as the product of the mass of the body and the acceleration of the body (i.e., F=m×a). This expression may be rearranged to express the mass as the result of dividing the total force acting on the body by the acceleration (i.e., m=F/a). As will be appreciated by one of skill in the art, this concept may be extended to the full three-dimensional dynamics acting on a rigid body, as summarized briefly below.

Figures 4A, 4B:
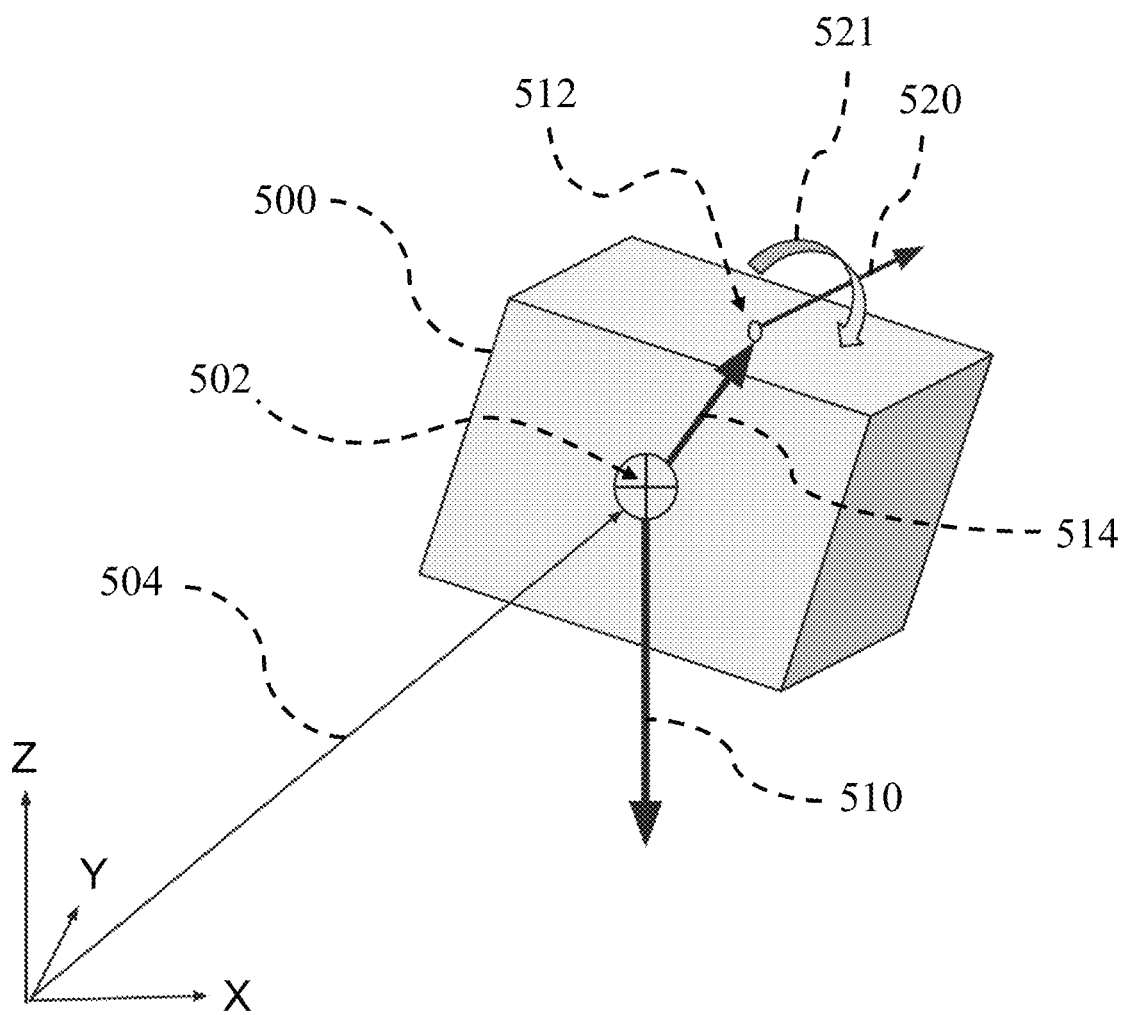
FIG. 4A is a schematic view illustrating forces and torques acting on a payload.
FIG. 4B illustrates how mass properties of an object may be determined from information relating to the forces, torques, and accelerations of the object.

FIG. 4A is a schematic representation of forces and torques acting on an object 500. As applied to robotic manipulation, the object 500 may be considered to be a payload that is grasped by an end effector of a robotic arm at a point of contact 512. The center of mass 502 of the payload may be located at a position 504 (which, in the following equations, is denoted $r_{com}$), and the point of contact 512 may be defined relative to the center of mass 502 by a vector 514 (denoted r in the following equations). A force of gravity 510 equal to the mass of the payload (m) multiplied by the acceleration due to gravity (g) may act on the payload at its center of mass 502. The end effector may exert forces 520 (F) and/or torques 521 ($\tau$) on the payload 500 at the point of contact 512. The forces and torques imparted on the payload 500 by the end effector may be represented by their components along the X, Y, and Z directions, as shown below:

$$\tau = \begin{pmatrix} m_x \\ m_y \\ m_z \end{pmatrix} F = \begin{pmatrix} f_x \\ f_y \\ f_z \end{pmatrix} \quad (1)$$

where $m_a$ is a moment about an A axis, and $f_b$ is a force along a B axis. The forces and torques may be combined into a single vector (herein referred to as the grasp wrench, $W_{grasp}$, according to the following:

$$W_{grasp} = \begin{pmatrix} F \\ \tau \end{pmatrix} \quad (2)$$

As will be appreciated by one of skill in the art, the rigid body dynamics may be expressed as follows:

$$\tau + r \times F = I\dot{\omega} + \omega \times I\omega \quad (3)$$

$$F - mg = m\ddot{r}_{com} \quad (4)$$

wherein the variables are defined as above, and wherein I denotes the payload inertia and $\omega$ denotes the payload angular velocity (and, according to standard notation, a variable with an overdot denotes a time derivative of that variable).

With knowledge of the forces 520 (F) and/or torques 521 ($\tau$) acting on the payload, as well as the linear accelerations ($\ddot{r}_{com}$) and/or angular accelerations ($\dot{\omega}$) of the payload, certain mass properties of the payload may be ascertained according to equation (4), as shown diagrammatically in FIG. 4B. Mass properties of the payload that may be estimated include the mass of the payload (which may be expressed as a single variable), the center of mass of the payload (which may be expressed as a vector of three variables, corresponding to the center of mass along the X, Y, and Z axes), and the moments of inertia of the payload (which may be expressed as a symmetric 3×3 tensor with six unique variables, including components $I_{xx}$, $I_{yy}$, $I_{zz}$, $I_{xy}$, $I_{xz}$, and $I_{yx}$).

The forces and/or torques (e.g., the wrenches) acting on the payload may be determined using one or more sensors. As described above in reference to FIG. 3, a robotic arm may include various sensors that produce signals from which forces and/or torques acting on the payload may be determined. For example, a 6-axis force/torque sensor associated with a wrist of a robotic arm may be used to determine the forces and torques (e.g., the wrenches) acting on the wrist due to the end effector and the payload grasped by the end effector. The portion of the total wrench contributed by the end effector may be calculated (e.g., based on a kinematic model of the robotic arm, and knowledge of mass properties of the end effector) and subtracted from the total wrench, enabling determination of the wrench applied by the payload on the wrist, and, consequently, the wrench applied to the payload by the end effector of the robotic arm.

The accelerations of the payload may be determined using one or more sensors. In the case of a mobile manipulator robot, the accelerations of the payload may depend at least in part on motion of the mobile base and/or motion of the robotic arm. For example, the payload may be accelerated if the mobile base is moving and the robotic arm is stationary (relative to the mobile base), if the robotic arm is moving and the base is stationary, or if the mobile base is moving and the robotic arm is moving (relative to the mobile base). As will be appreciated by one of skill in the art, the motion of the mobile base may be determined based on signals from one or more sensors (e.g., encoders associated with wheels of the mobile base, or optical flow associated with an image sensor), or may be determined based on a model of the mobile base (e.g., a model that relates variables such as motor currents, wheel speeds, and/or motion of the mobile base). Similarly, as will be appreciated by one of skill in the art, the motion of the robotic arm may be determined based on signals from one or more sensors (e.g., encoders associated with the various joints of the robotic arm), or may be determined based on a model of the robotic arm (e.g., a model relates variables such as motor currents, joint angles/ velocities/accelerations, link lengths, and/or arm kinematics). In some embodiments, accelerations of the payload may be determined using one or more accelerometers (or other appropriate sensors) disposed on an end effector of a robotic arm. Instrumenting an end effector with one or more accelerometers may enable more direct measurement of the accelerations of the payload.

Accordingly, mass properties of a payload may be estimated based, at least in part, on the wrench applied to the payload and the accelerations of the payload. Mass properties may include a mass of the payload, a center of mass of the payload, and one or more moments of inertia of the payload. In some embodiments, the mass properties of the payload may include ten separate variables, including one variable associated with the mass of the payload, three variables associated with the center of mass of the payload, and six variables associated with the moments of inertia of the payload.

The inventors have recognized and appreciated that it may be advantageous to excite certain body dynamics by moving a payload through a series of motions in a process referred to herein as an excitation routine. An excitation routine may be used to generate enough data (e.g., sensor data relating to forces, torques, and/or accelerations) to enable robust estimation of different mass properties. For example, if a payload is only moved in a vertical direction, a mass estimation method may be unable to estimate certain mass properties (e.g., a vertical position of a center of mass, or certain moments of inertia). In contrast, if a payload is moved in a trajectory associated with forces along different axes and torques about different axes, richer sensor data may be collected that may enable estimation of additional mass properties (and with greater accuracy).

Figure 5:
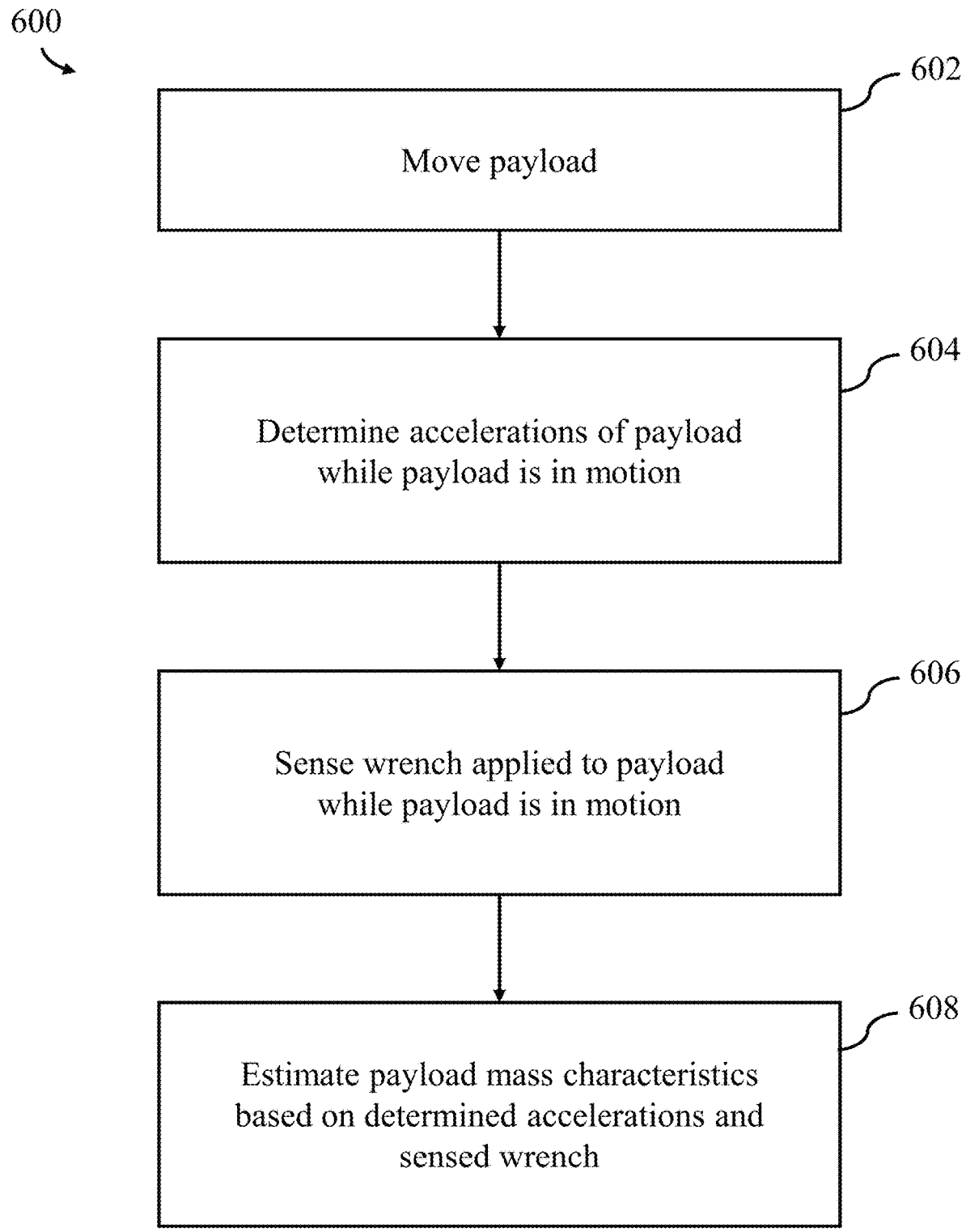
FIG. 5 depicts a flowchart of one embodiment of a method of estimating payload mass characteristics.

FIG. 5 depicts a flowchart of one embodiment of a method 600 of estimating one or more mass properties of a payload. At act 602, a robot (e.g., an integrated mobile manipulator robot) moves the payload (e.g., through an excitation routine). While the payload is in motion, the accelerations (e.g., linear and angular accelerations associated with different axes) of the payload may be determined, as at act 604, and the wrench applied to the payload may be sensed (e.g., using one or more sensors of the robot), as at act 606. At act 608, the mass properties of the payload may be estimated based, at least in part, on the determined accelerations and the sensed wrench.

As described above, sensing the wrench applied to the payload may include sensing the wrench applied to the payload by an end effector of a robotic arm of the robot. In some embodiments, sensing the wrench applied to the payload may include sensing a wrench associated with a wrist of the robotic arm.

As described above, determining the accelerations of the payload may include determining accelerations based on motion of the robot, such as accelerations of the robotic arm (e.g., based on joint motions of the robotic arm and a kinematic model of the robotic arm), and/or the motion of the mobile base to which the robotic arm is coupled. In some embodiments, accelerations of the payload may be determined using one or more sensors associated with an end effector of the robotic arm.

In some embodiments, a mass estimation method may converge within a predetermined time period. For example, in some embodiments, one or more mass properties of a payload may be estimated within a time period of less than 0.75 second. In some embodiments, one or more mass properties of a payload may be estimated within a time period of less than 0.5 seconds, while in some embodiments, one or more mass properties of a payload may be estimated within a time period of less than 0.4 seconds.

In some embodiments, a mass estimation method may include certain assumptions and/or prior information, referred to herein generally as priors. That is, in some embodiments, one or more mass properties of a payload may be estimated based, at least in part, on one or more priors. For instance, information relating to the physical dimensions of a payload may be used in a mass estimation method to simplify (and/or increase the speed of) estimation. As one specific example, if a mass estimation algorithm is seeded with the information that a payload is a rectangular prism of a particular width, length, and depth, such prior information may be used to accelerate calculation of certain moments of inertia. Priors may be introduced manually (e.g., by a human operator overseeing operation of a manipulation task), or automatically. In some embodiments, a robot may implement a mass estimation algorithm while manipulating a first payload, and then may use information derived from manipulating the first payload during execution of a mass estimation algorithm while manipulating a second payload. For example, if, after manipulating a first box, the robot encounters a second box that is determined to be similar to the first box (e.g., the second box is sensed to have similar dimensions to the first box, or visual information printed on a side of the box (such as a company logo) is consistent between the first and second boxes), a mass estimation algorithm may make assumptions about the second box that increase the speed of convergence. In some embodiments, a mass estimation algorithm may be deemed irrelevant for the second box, and mass properties obtained from executing a mass estimation algorithm for the first box may be assumed for the second box.

Figure 6:
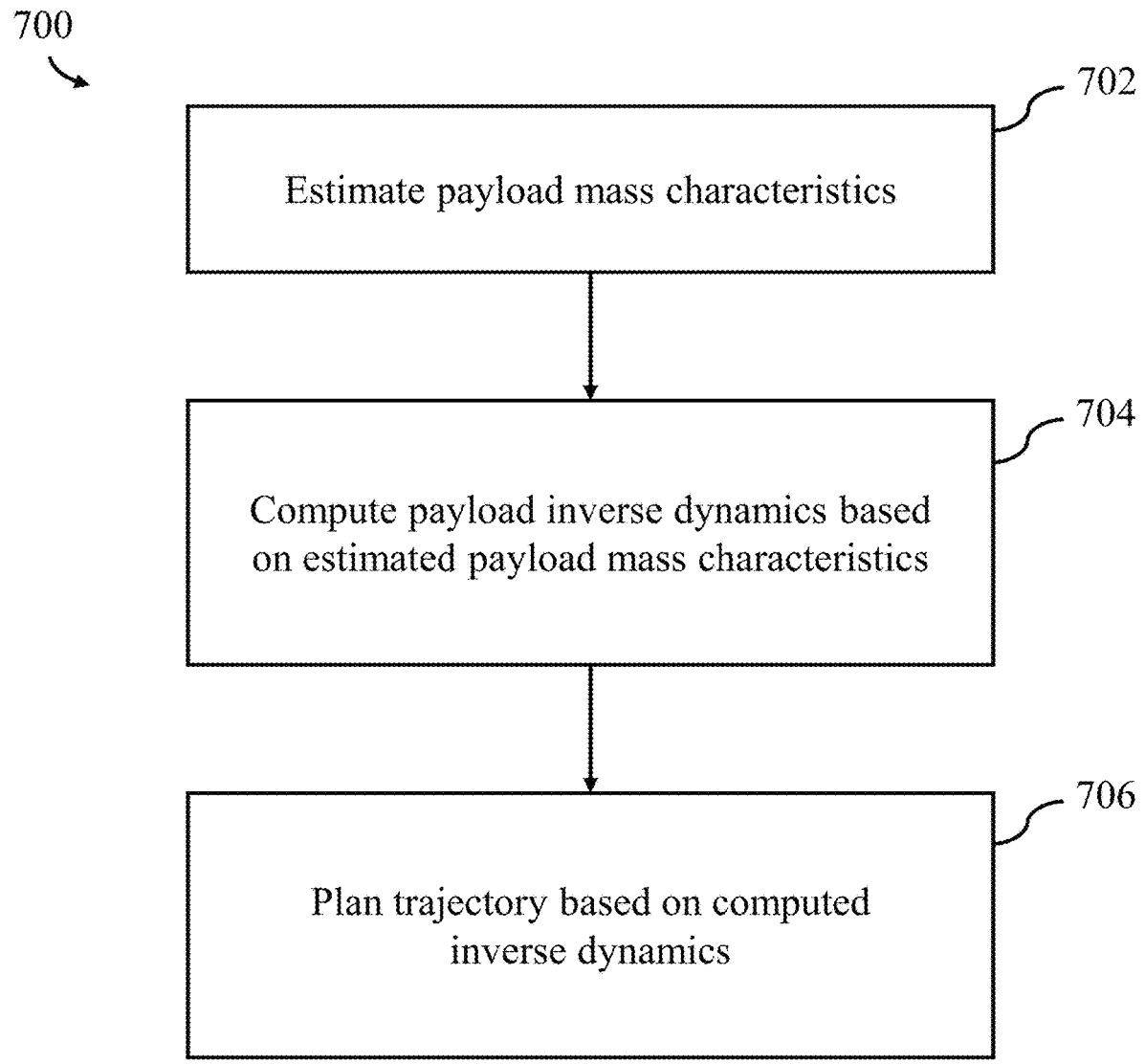
FIG. 6 depicts a flowchart of one embodiment of a method of planning a trajectory.

After one or more payload mass properties have been estimated, the estimated mass properties may be used to plan a trajectory of the payload. FIG. 6 depicts a flowchart of one embodiment of a method 700 of planning a trajectory. At act 702, payload mass properties may be estimated (according to one or more mass estimation methods described herein, such as the mass estimation method described above in relation to FIG. 5). At act 704, inverse dynamics of the payload may be computed based on the estimated mass properties. At act 706, a trajectory may be planned based on the computed inverse dynamics. In some embodiments, computing inverse dynamics may include computing torques to be applied at the joints of a robotic arm. In some embodiments, planning a trajectory may include planning an optimized trajectory. Planning an optimized trajectory may include optimizing the speed and/or acceleration of a payload, or minimizing a wrench applied to the payload (e.g., a wrench applied by an end effector of the robotic arm). Of course, a trajectory may be optimized according to other constraints, and the present disclosure is not limited to the specific examples of optimized trajectories presented herein.

It should be appreciated that a mass estimation algorithm may be executed at any time and with any desired frequency while a payload is manipulated. In some cases, a mass estimation algorithm may be executed after initial contact with a payload (e.g., after an end effector first grasps the payload). In some cases, a mass estimation algorithm may be executed continuously as the payload is manipulated. In some embodiments, a mass estimation algorithm may be executed a first time according to a first set of parameters. If a subsequent path planning algorithm is unable to determine a feasible trajectory (e.g., based on the payload mass properties estimated by the mass estimation executed according to the first set of parameters), the mass estimation algorithm may be executed a second time according to a second set of parameters. For example, more sensor data may be provided or a longer convergence time may be allotted during the second execution of the mass estimation algorithm to increase the likelihood of estimating payload mass properties that may yield a feasible trajectory.

Figure 7:
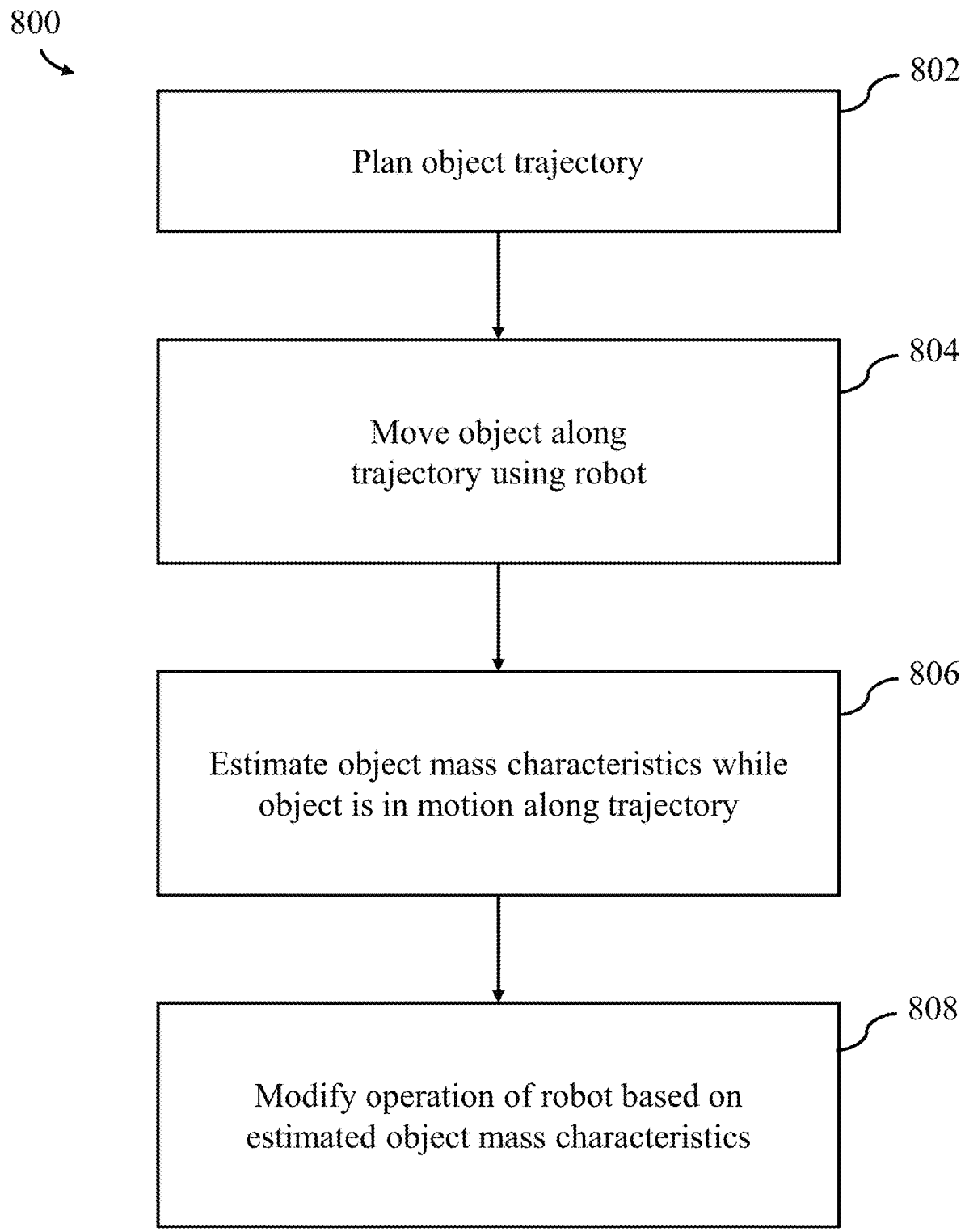
FIG. 7 depicts a flowchart of one embodiment of a method of manipulating an object.

FIG. 7 depicts one embodiment of a method 800 of manipulating an object using a robot. At act 702, a trajectory of the object (e.g., a payload grasped by an end effector of a robotic arm of the robot) may be planned. At act 704, the object may be moved along the planned trajectory by the robot. At act 706, payload mass properties may be estimated as the payload is in motion along the trajectory. At act 708, operation of the robot may be modified based on the estimated payload mass properties. In some embodiments, modifying operation of the robot may include planning a second trajectory different from the first trajectory. Planning the second trajectory may include planning the second trajectory using inverse dynamics computed using the estimated mass properties, or planning the second trajectory to limit a wrench applied to the payload by the robot within a predetermined range. In some embodiments, modifying operation of the robot may include adjusting a motion of the robotic arm (e.g., by adjusting one or more torques applied at one or more joints of the robotic arm), adjusting a motion of a mobile base of the robot, or by adjusting a motion of the robotic arm and of a mobile base to which the robotic arm is coupled.

In some embodiments, an integrated mobile manipulator robot may include a controller or other computing device configured to execute the dynamic mass estimation methods (and other methods) described herein. The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the terms "physical processor" or "computer processor" generally refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

The invention claimed is:

1. A method of estimating one or more mass characteristics of a payload manipulated by a robot, the method comprising:
    moving the payload using the robot, wherein the payload is grasped by an end effector of the robot;
    determining one or more accelerations of the payload while the payload is in motion;
    sensing, using one or more sensors of the robot, a wrench applied to the payload while the payload is in motion;
    estimating the one or more mass characteristics of the payload based, at least in part, on the determined accelerations and the sensed wrench; and
    planning, while the payload remains grasped by the end effector of the robot, a trajectory based, at least in part, on the estimated one or more mass characteristics of the payload.

2. The method of claim 1, wherein:
    determining the one or more accelerations of the payload while the payload is in motion comprises determining the one or more accelerations of the payload while the payload is moved through an excitation routine; and
    sensing the wrench applied to the payload while the payload is in motion comprises sensing the wrench applied to the payload while the payload is moved through the excitation routine.

3. The method of claim 1, wherein determining the one or more accelerations of the payload comprises determining the one or more accelerations of the payload based, at least in part, on one or more motions of the robot.

4. The method of claim 3, wherein determining the one or more accelerations of the payload based, at least in part, on the one or more motions of the robot comprises:
    determining one or more joint motions of a robotic arm of the robot; and
    determining one or more accelerations of the robotic arm based, at least in part, on the one or more joint motions and a kinematic model of the robotic arm.

5. The method of claim 3, wherein determining the one or more accelerations of the payload based, at least in part, on the one or more motions of the robot comprises determining the one or more accelerations of the payload based, at least in part, on the one or more motions of a robotic arm of the robot and motion of a mobile base of the robot, wherein the robotic arm is operatively coupled to the mobile base.

6. The method of claim 1, wherein sensing the wrench comprises sensing the wrench applied to the payload by an end effector of a robotic arm of the robot.

7. The method of claim 1, wherein sensing the wrench comprises sensing a wrench associated with a wrist of a robotic arm of the robot.

8. The method of claim 7, wherein sensing the wrench associated with the wrist of the robotic arm comprises sensing the wrench using a 6-axis force/torque sensor.

9. The method of claim 1, wherein estimating the one or more mass characteristics of the payload comprises estimating one or more of a mass of the payload, a center of mass of the payload, and one or more moments of inertia of the payload.

10. The method of claim 1, wherein estimating the one or more mass characteristics of the payload comprises estimating at least ten mass characteristics, wherein the at least ten mass characteristics comprise one mass parameter, three center of mass parameters, and six moment of inertia parameters.

11. The method of claim 1, wherein estimating the one or more mass characteristics of the payload comprises estimating the one or more mass characteristics of the payload within a time period of less than 0.5 seconds.

12. The method of claim 1, wherein estimating the one or more mass characteristics of the payload comprises estimating the one or more mass characteristics of the payload based, at least in part, on one or more priors.

13. The method of claim 12, wherein estimating the one or more mass characteristics of the payload based, at least in part, on the one or more priors comprises estimating the one or more mass characteristics of the payload based, at least in part, on one or more physical dimensions of the payload.

14. A method of planning a trajectory, the method comprising:
    estimating one or more mass characteristics of a payload according to the method of claim 1;
    computing inverse dynamics of the payload based, at least in part, on the estimated one or more mass characteristics of the payload; and
    planning the trajectory based, at least in part, on the computed inverse dynamics.

15. The method of claim 14, wherein computing the inverse dynamics comprises computing one or more torques to be applied at one or more joints of a robotic arm of the robot.

16. The method of claim 14, wherein planning the trajectory comprises optimizing the trajectory based, at least in part, on the estimated one or more mass characteristics of the payload.

17. The method of claim 16, wherein optimizing the trajectory comprises optimizing one or more of a speed of the payload and an acceleration of the payload.

18. The method of claim 16, wherein optimizing the trajectory includes minimizing the wrench required to displace the payload.

19. The method of claim 1, further comprising controlling an operation of the robot based, at least in part, on the trajectory.

20. A robot comprising:
    a robotic arm;
    an end effector operatively coupled to a distal portion of the robotic arm;
    one or more sensors; and
    a controller configured to:

determine one or more accelerations of a payload grasped by the end effector of the robot while the payload is in motion;

determine a wrench applied to the payload while the payload is in motion based on signals from the one or more sensors;

estimate one or more mass characteristics of the payload based, at least in part, on the determined accelerations and the determined wrench; and plan, while the payload remains grasped by the end effector, a trajectory based, at least in part, on the estimated one or more mass characteristics of the payload.

21. The robot of claim 20, wherein:

the controller is configured to determine the one or more accelerations of the payload while the payload is moved through an excitation routine; and the controller is configured to determine the wrench applied to the payload while the payload is moved through the excitation routine.

22. The robot of claim 20, further comprising a mobile base, wherein the robotic arm is operatively coupled to the mobile base.

23. The robot of claim 20, wherein the controller is further configured to:

determine one or more joint motions of the robotic arm; and determine one or more accelerations of the robotic arm based, at least in part, on the one or more joint motions and a kinematic model of the robotic arm.

24. The robot of claim 20, wherein the controller is configured to determine a wrench applied to the payload by the end effector.

25. The robot of claim 20, wherein the one or more sensors are configured to sense a wrench associated with a wrist of the robotic arm.

26. The robot of claim 20, wherein the one or more sensors comprise a 6-axis force/torque sensor.

27. The robot of claim 20, wherein the controller is configured to estimate one or more of a mass of the payload, a center of mass of the payload, and one or more moments of inertia of the payload.

28. The robot of claim 20, wherein the controller is configured to estimate at least ten mass characteristics, wherein the at least ten mass characteristics comprise one mass parameter, three center of mass parameters, and six moment of inertia parameters.

29. The robot of claim 20, wherein the controller is further configured to control an operation of the robot based, at least in part, on the trajectory.

* * * * *